Oct. 12, 1965 H. W. WILSON 3,211,470
CODED COUPON
Filed July 2, 1963 3 Sheets-Sheet 1
FIG. 1
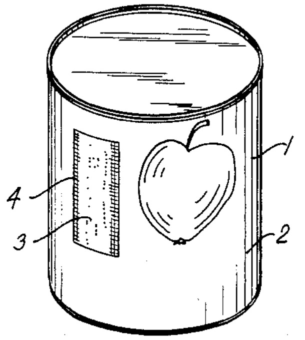
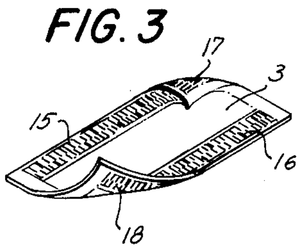
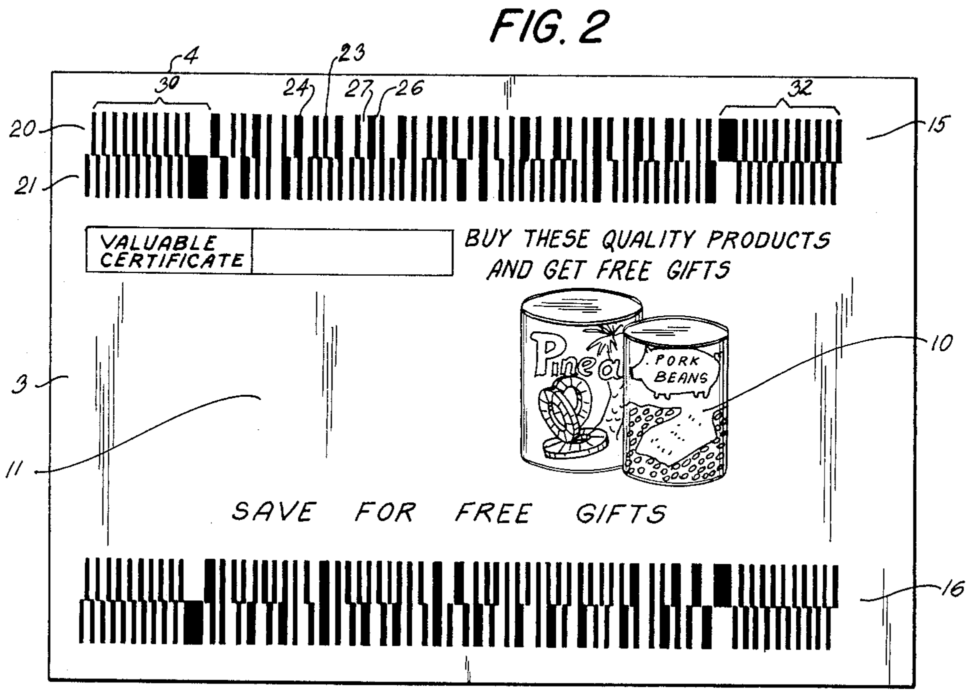
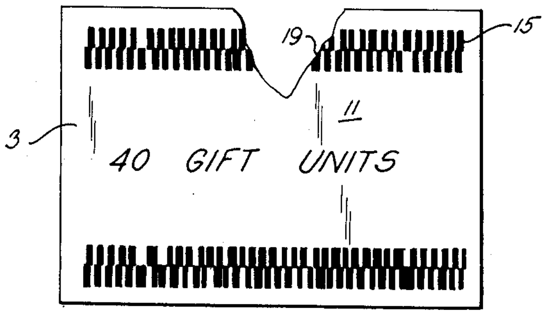
FIG. 4
INVENTOR.
HOWARD W. WILSON
BY
Kane, Dalsimer and Kane
ATTORNEYS

INVENTOR.
HOWARD W. WILSON

BY

Kane, Dalsimer and Kane
ATTORNEYS

CODED COUPON

Filed July 2, 1963

INVENTOR.
HOWARD W. WILSON

BY

Kane, Dalsimer and Kane
ATTORNEYS

United States Patent Office 3,211,470

Patented Oct. 12, 1965

3,211,470

CODED COUPON

Howard W. Wilson, Edina, Minneapolis, Minn., assignor to Gift Stars, Inc., Minneapolis, Minn., a corporation of Minnesota Filed July 2, 1963, Ser. No. 292,286
2 Claims. (Cl. 283—18)

This invention relates to a merchandising coupon for use primarily in the distribution of consumer products. It may be used either as a part of a label on a package or, alternatively, may be a separate unit included within a package. It utilizes surfaces of variable absorbability, as part of the coupon patterning, to encode data therein. The code itself is so arranged that, in the event the coupon is defaced or otherwise mutilated, the remaining such surfaces will regenerate the missing characters.

Coupons used for premium purposes with consumer goods have in the past normally been of one of two types. They have either been printed coupons, normally printed on paper which are read and handled manually and which can contain no significant amount of data, or they have been card coupons with holes punched in them to represent desired information. The former have been unsatisfactory because of the tremendous amount of time required to handle them, the possibility of error, and the nominal quantity of data that may be recorded and so made available to the supplier when the coupon is redeemed. The latter have been unsatisfactory because they have cost considerably more than paper, the special punch equipment needed for producing them, the necessity for careful handling without bending or mutilation, and the relatively slow processing rate. They are readily subject to tampering or destruction by varying the holes. In addition, they cannot be made part of a package label, but must be a separate unit and carefully handled.

The objects of my invention include the provision of a premium coupon that may be made of ordinary label paper rather than card, and which may have considerable quantities of data encoded thereon.

It is a further object of my invention to provide such a coupon in which the encoded data does not detract from or deface other written or illustrative matter on the coupon, but, on the contrary, adds an attractive pattern to the coupon.

It is a further object of this invention to provide such a coupon which is capable of receiving a maximum amount of mutilation without loss of encoded information. This coupon can be dog-eared, torn, folded, subject to smears or cuts, and even be partially missing. Yet it can provide all of the information sought and can regenerate information destroyed through this mutilation.

It is a further object of my invention to have such a coupon which is capable of storing the maximum quantity of data in a small space, such data including information as to particular product, size and packaging of product, region of distribution, manufacturer, premium value, price of product or any other desired data, and which may be produced by normal label printing means.

Another object of my invention is to provide such a coupon which can be handled and cleared mechanically through optical scanning means and yet protects itself against counterfeits.

Another object of my invention is to provide such a coupon having areas of relatively high and low light absorbability permitting encoding of data in a form directly utilizable by a computer without the necessity for interpretive calculations.

Another object of my invention is to provide such a coupon which is also capable of carrying data for purposes other than merchandising programs, such as for inventory control.

These and other objects are accomplished by utilizing a rectangular printed coupon having codes created along one or more edges through surfaces of variable light absorbability or reflectivity. The codes, being optical, may be printed of ordinary printing ink in binary form in rows along one or more longitudinal edges and, if desired, also along the corresponding edges of the reverse side of the coupon. This allows for read-out of the coupon in any position which it may be inserted into an optical scanner.

The coding of my invention preferably provides for sufficient binary bits in two groups along the margins. Thus, I use a coupon having two rows of forty-eight bits of information along each longitudinal edge. These bits are grouped by classifications of data in groups of four-bit data units. Additional four-bit units are provided for each group of three four-bit data units to provide a parity check and regeneration means. Also encoded, in addition to data as to manufacturer, product, and the like, previously mentioned, could be a portion with a counterfeit checking code, such that if the coupon were not genuine, the code would so indicate to the scanner and computer, and the coupon would thereby be rejected.

The coupon of my invention is best read out and computed through an optical scanner composed of a paper handling unit adapted to feed the coupon at a fast rate through optical scanners. The scanning is coupled with temporary storage for purposes of comparison with the parity checks and for regeneration of lost or mutilated portions. A computing unit associated with the optical read-out stores and tabulates each of the classes of information previously encoded and allows for automatic billing of the suppliers of the coupons, and for tabulation of other data of interest.

Turning to the drawings:

FIG. 1 is a perspective view of an ordinary can of food bearing a label containing one of the premium coupons of this invention;

FIG. 2 is a plan view of one form of coupon of this invention;

FIG. 3 is a perspective of the coupon partially folded to show the encoding tracks on both sides thereof;

FIG. 4 is a plan view of a typical mutilated coupon;

Figure 5:
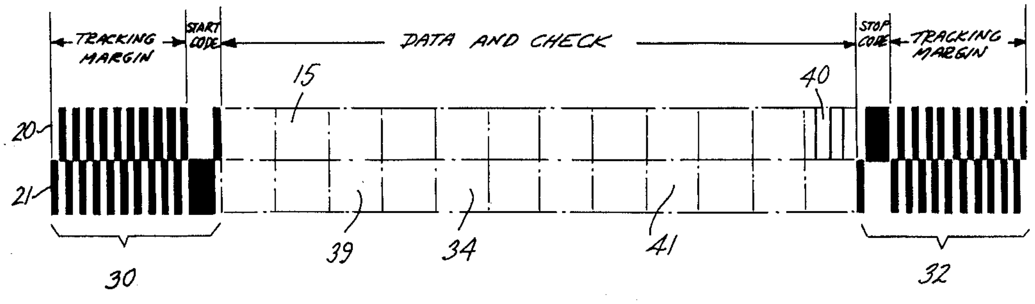
FIG. 5 is an enlarged view of the coding tracks along one longitudinal edge of the coupon showing a preferred method of encoding.

In FIG. 1 there is shown an ordinary container of food 1 having a label 2 thereon made of paper or similar sheet material. Printed as a portion of a label may be a premium coupon 3. Preferably, along the margins of coupon 3 is a serration 4 to provide for easy removal of the coupon 3 from the remainder of label 2.

As shown in FIG. 2, coupon 3 is a rectangular piece of paper having as its main body portion pictures 10 or other advertising copy. As shown in FIG. 2, the coupon has a certain amount of blank space 11 which may, if desired, be used for additional advertising copy or for required legal notices.

Along one longitudinal edge of coupon 3 is provided a coded portion or track 15. The opposite longitudinal portion also has a coded portion 16 and, as shown in FIG. 3, corresponding coded portions 17 and 18 appear on the opposite side of coupon 3. Preferably the "start" portion of each track is at the same relative position on the coupon. For example, "start" could be located for each track such that it would be at the left-hand end of the upper track for all possible horizontal positions of the coupon.

Each of tracks 15, 16, 17 and 18 are alike; the tracks in the preferred form of my invention are double. Thus, track 15, for example, is made up of rows 20 and 21. The rows 20 and 21 are defined by rectangular printed bars 23 running transversely of the longitudinal axis of the track. Bars 23 may be single, may be double as at 24, or may have greater plurality. Between the bars there may be spaces, such as single space 26 or double space 27. Each single space or single bar represents a measured and equal distance along the longitudinal axis of the particular row in question. Thus, for a given and uniform distance in a row there will be either a bar or a space, providing a pattern of areas of relatively high and low light absorbability or reflectivity over the length of the row. If desired, the relative high and low absorbability may lie in the invisible portions of the light spectrum. Accordingly, a binary code is provided which could represent "1" for a bar and "0" for a space, or vice versa. This binary pattern of light-absorbing bars is predetermined to convey, in code, the information desired.

Since a binary code is being used, the amount of information that can be encoded in a given track, such as track 15, would be equal to the number 2 to the power equal to the number of possible bars or spaces. In the form of my invention shown there are forty-eight positions for bars or spaces in each of the two rows in a given track, providing for an amount of data equal to 2 to the power 96. In practice, however, the maximum amount of data is normally not encoded, since, for convenience, particular zones of bars and spaces are reserved for particular data, such as the name of the manufacturer, or the product in question, or the value of the gift coupon. Consequently, only sufficient of each zone is used as is necessary to encode the desired data. In addition, as will be shown below, parity check zones are provided which again reduce the amount of original information recorded.

The utilization of bars to produce a binary code allows the associated read-out means to handle the information directly. No intermediate number-reading and conversion unit, or the like, is necessary to convert received data into a form for efficient computer use.

If desired, a portion of the end of each of the tracks may be used to encode a "start" and a "stop" for the read-out for each coupon. It may also encode a counterfeit check code. Thus, track 15 has at the right-hand end 30 some twenty-five positions providing a "start" encoding pattern. Likewise, the other end 32 has a similar pattern representing the "stop" end.

Due to the parity check and data regeneration features of my invention, the data tracks may be mutilated and the data still read. Thus, for example, in FIG. 4 a portion of the track has been destroyed. As will be shown below, the data on track 15 can still be used, even without use of the duplicate data on other tracks.

One particular arrangement for grouping of information is shown in FIG. 5 for track 15. It could just as well be one of the other tracks 16, 17 or 18, since each correspond and each has the same row, such as row 20, nearest the edge of the coupon 3.

Track 15 has the "start" identification portion 30 at one end, the "stop" portion 32 at the other end, outer row 20 and inner row 21. Portions 30 and 32 may include any desired arrangement of bars and spaces, just as long as the scanner is programmed for that pattern and, preferably, all coupons to be used with that scanner have the same arrangement.

In each row between the "start" and "stop" positions are spaces for forty-eight bits of information. These bits are, for purposes of grouping and encoding, divided up into sub-groups or fields for each row, probably of four bits each, and are shown in FIG. 5 in block fashion. Thus, for example, sub-group 34 would represent a space of a size capable of receiving four bits of information in row 21. Some of these groups may represent data and others of them represent parity and regenerating check, the purposes of which will be shown below. Of the forty-eight bits in a row, preferably thirty-six are used for data and twelve are used for checking.

For convenience in understanding it is also helpful to give a number to each of the bit positions, even though within specific groups. The system of numbering I have found to be most useful is that shown in FIG. 6. There it will be noted that the various groupings are shown for the rows 20 and 21. Commencing in the upper row 20 at the right end the first twelve bits are numbered sequentially from 1 to 12. The numbering then runs in row 21 beginning at the right with number 13 continuing in that row to number 36. The numbering then proceeds in the upper row 20 and runs from 37 to 60. And, again in the lower row, proceeds from 61 to 84. It thereafter goes to the upper row for bits 85 through 96. In this pattern of numbering the rows alternate and overlap in their numbering. There is a group of twelve bits in one row followed by an overlapping group of twenty-four on the next row, followed by overlapping group of twenty-four on the first row, etc.

This, then, provides for ninety-six binary bits of information coded on a coupon. The information is printed in bar codes on two tracks or channels, forty-eight bits per track, by using patterns of relatively high and low light absorbability.

The forty-eight bits on each track comprise thirty-six data bits and twelve checking bits divided, as above described, into groups of four-bit areas or fields. The checking bits are preferably divided into three four-bit groups for each row, with one checking group for each three data groups. The data groups for a particular checking group are dispersed relative to one another. This means that a greater area of defacement of the coupon can be detected and corrected by means of the check groups. Thus, for example, the check group shown by numeral 39 in FIG. 5 may relate to the data groups identified by the numerals 40, 41 and 42, respectively.

Figure 6:
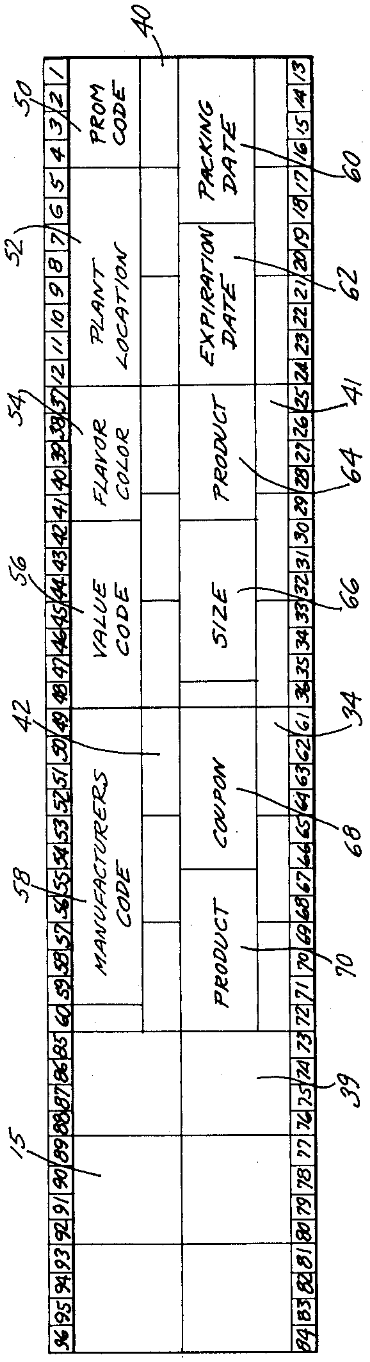
FIG. 6 is an enlarged view of the central portion of FIG. 4 showing details of encodation of various data groupings.

As arranged on the coupon 3, as shown in FIG. 6, bit positions 1 through 24 contain the six data areas that become the first group for each of the six check sets; bit positions 25 through 48 contain the six data areas that become the second data group for each of the six check sets; and bit positions 49 through 72 contain the six data areas that become the third data group for each of the six checking groups. The checking groups themselves are found in bit positions 73 through 96.

The data in each checking group represents the half-add sum of its respective three data groups, i.e., the binary sum without carry. For example:

*Encoded binary number*

```
data groups  {1101
             {1001
             {0111
              ----
half-add sum  0011
```

Therefore, by adding the three data groups on a half-add basis and comparing the sum with the respective check groups, errors resulting from mutilation of the coupon may be discovered. If there is a missing group it can be regenerated by making a half-addition of the remaining groups, including the check group. Thus, for example, if the first data group were missing from the above example, it would be regenerated by half-addition of the other two data groups and the half-add sum, as follows:

```
remaining data groups {1001
                      {0111
         half-add sum  0011
                       ----
        missing group  1101
```

It will be seen that this half-add sum is the same as the original, now missing data group. A similar regeneration of the same type could likewise be made if either of the other data groups had been missing instead of the one shown.

Accordingly, it can be seen that, with the three groups of each set dispersed, the coupon may receive substantial mutilation before regeneration is made impossible by destruction of more than one data group of a set of three.

If more than one group of a set is destroyed, the detection may be used either to reject the coupon or to correct it by referring to another data track. What is done becomes a matter of programming.

As stated above, FIG. 6 shows a possible arrangement for best utilization of the various zones shown in FIG. 5. These zones have been re-divided into groupings of appropriate size, as for example, promotional codes 50, plant location of supplier 52, flavor, color, and the like 54, value of coupon 56, particular manufacture identification codes 58, packing date 60, offer expiration date 62, product 64, size package 66, particular coupon identification 68, and other and further product data 70. Preferably, though not necessarily, each one of these groups is coded with the most significant bit to the left, to be read first. This, of course, is a matter of design choice.

Figure 7:
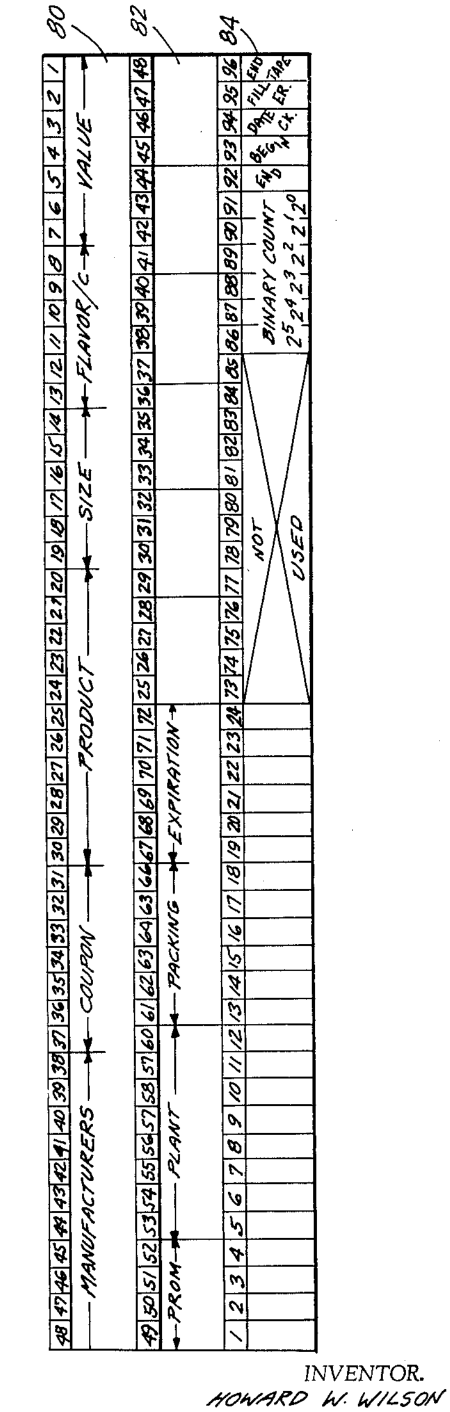
FIG. 7 is a diagram showing the data of FIG. 6 as it is recorded on tape prior to transmission to a tabulating unit, showing the correspondence of coupon bit positions to memory bit positions.

As it is optically scanned, the data from each coupon is put into a buffer register and then recorded on magnetic tape. The arrangement of data on this memory is shown in FIG. 7. Here two rows 80 and 82 of recorded data are entered in the sequence shown in FIG. 7, and a third row 84 provides check data.

Figure 8:
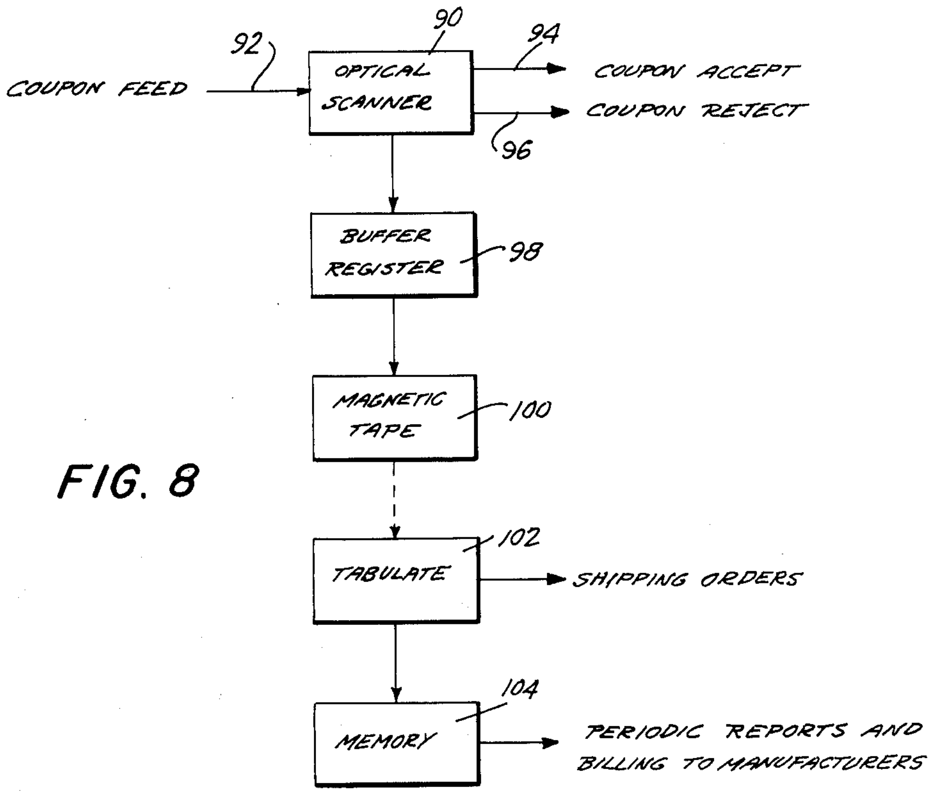
FIG. 8 is a simplified flow diagram of a typical optical read-out and memory for use with the coupon of my invention.

FIG. 8 shows a simplified flow diagram for the information received from the coupons and for the coupons themselves. An optical scanner 90 is provided with a feed 92 to receive the coupons and pass them one by one past the scanning means. The scanner has provision for making certain that the coupons have the proper start code or portion, such as portion 30 and the upper proper "stop" portion, such as portion 32. It may also be adapted to reject coupons in the event they have insufficient data groups, that is, have been mutilated beyond the ability of the unit to regenerate the characters. If the coupons are accepted as having all of the necessary coding, they pass from the scanner to a coupon accept area 94. If they do not, they are rejected at 96.

The information encoded on the coupon both in terms of data groups and check groups is detected by the optical scanner 90 because of the existence of areas of either relatively high and low reflectivity or relatively high and low light absorbability, as discussed above. The bits of information represented are passed to a buffer register 98 where they are held before being recorded on magnetic tape 100. This recording on tape may be in a different sequence than the sequence in which the data was actually grouped on the coupon. This variation in sequence is made possible by the use of buffer register 98.

After a group of coupons has been run, and the tape has been prepared, the tape 100 is then processed by computer 102 where the data is tabulated. Computer 102 provides for the printing of shipping orders to the various customers that have sent in the premium units. This, then, provides shipping orders giving addresses and names of customers together with itemization of premiums desired for the shipment.

The data as to various premiums selected and all of the other data which has been encoded on the coupon, as shown in FIG. 6, is then stored in a memory system 104. Periodically, there is a read-out of all or desired portions of the data from memory 104 and reports and billing for premium costs may be sent to participating manufacturers.

In addition to the groups of coupons run through optical scanner 90, it is desirable also to include a "batch" coupon with each group of coupons forwarded by a customer with a request for premiums. This "batch" coupon can have in code identification the name and address of the customer as well as the premium or premiums desired. This enables the tabulator 102 to prepare the necessary shipping orders.

FIG. 7 has rows 80 and 82 shown on the magnetic tape for recording the data obtained through scanning of the coupon. The sequence of data in rows 80 and 82 need not conform to the sequence of the data on the coupon, but may be so positioned as to provide for more ready computation. Any desired sequence may be obtained by use of the buffer register 98, providing that the data is read from the register in a different sequence that it is read into the register.

In addition, it is desirable in many instances to include a third row on the tape which can indicate the condition of the coupon and other desired matters. For instance, one type of recording for row 84 would be that shown in FIG. 7 which provides for bit portions 1 through 24 for entries in the event any one of the groups is missing. This can, therefore, be used to key the computer that regeneration will be necessary. In addition, as shown in positions 86 through 91, one can have a total binary count of the coupon which will enable the computer to determine whether there are sufficient total bits available on the coupon to permit of regeneration of the missing fields. Other bits of data that may be entered are shown by positions 92 through 96 which may represent as shown here "sure" end, i.e., portion 32 was complete, i.e., "sure" beginning, i.e., portion 30 was complete, counterfeit data checks, filler portions, and whether the magnetic tape itself is about to reach the end.

In the within disclosure the data areas of relatively high and low light-absorbability have been shown in four identical tracks along each of the four longitudinal edges of the coupon. It will be appreciated that if desired for purposes of design or otherwise, less than four such tracks may be used or even just one such track. Under such circumstances, to avoid the necessity for aligning all coupons before read-out, the optical scanner 90 should be provided with four sets of scanning means so that there will be a scan of the edge bearing the data bars regardless of the position of the coupon when inserted into the machine. Under such circumstances, the scanner should be programmed to reject the readings from three of the four scanning means and to accept only that one which has been properly programmed with a "start" signal showing that it is the one to receive the data.

It will be appreciated that the encoding through these light-asborbing areas need not in all instances be in a group of bars defining a straight line, nor need they be along the longitudinal edge, such again becomes a matter of design. It will be realized by those skilled in the art that a similar pattern could be produced by a group of dots, by a group of radial lines, by a group of concentric circles, or the like. The only requirement is that there be an encoded pattern based upon uniform spacing and that the scanning means used be capable of reading it in a read-out sequence corresponding to the sequence of the printed bars or other units themselves.

Various changes and modifications of the above coupon may be made without departing from the spirit of my invention.

I claim:

1. A coupon adapted for premium redemption and for scanning in an optical scanner comprising: a rectangular sheet of greater length than width so that the sheet can be automatically oriented and having two opposite face surfaces, two longitudinal edges and two transverse end edges; optically scannable indicia presenting relatively light absorbing and light reflecting portions representing encoded information arranged in four separate tracks of similar pattern formed on the two surfaces of the sheet with a track being positioned relatively adjacent and extending substantially parallel to each longitudinal edge on each surface with the indicia in all of the tracks being oriented in the same manner with respect to the longitudinal edge adjacent the track, each track being subdivided into equal units of distance, each of said portions covering at least one entire unit, said portions being in the form of bars arranged in two adjacent rows for each track, said pattern being arranged to encode information in binary form, whereby the amount of information that can be encoded in said track is equal to the number 2 to the power equal to the number of possible bars in said track, the patterns in all of the groups being arranged so as to be scannable in a direction longitudinally of the sheet with the pattern of the two tracks formed on the same side of the sheet being arranged to extend in relatively opposite longitudinal directions and with the patterns on one side of the sheet extending in opposite longitudinal directions from the patterns of the immediately opposite tracks on the opposite side of the sheet whereby all of the patterns can be scanned in the same longitudinal direction when the sheet is oriented so that the pattern is in the same relative positon in space; and said coupon and the indicia thereon being so constructed and arranged to be capable of storing a substantial and predetermined quantity of information in a relatively small space and a substantial and predetermined mutilation without loss of encoded information.

2. The invention in accordance with claim 1 wherein a relatively larger coupon bearing sheet is provided and said coupon forms a detachable part of said sheet for removal from said sheet for redemption.

References Cited by the Examiner

UNITED STATES PATENTS

| | | | |
|---|---|---|---|
| 3,106,706 | 10/63 | Kolanowski et al. ---- | 283—8 X |
| 3,108,824 | 10/63 | Fischer et al. --------- | 283—56 |

EUGENE R. CAPOZIO, *Primary Examiner.*

LAWRENCE CHARLES, JEROME SCHNALL, *Examiners.*

UNITED STATES PATENT OFFICE

Certificate

Patent No. 3,211,470

Patented October 12, 1965

Howard W. Wilson

Application having been made by Howard W. Wilson, the inventor named in the patent above identified; and Honeywell Inc., Minneapolis, Minnesota, a corporation of the State of Delaware, an assignee, and Walter H. Gray of Wayland, Massachusetts, John O. Wiley of Hopkinton, Massachusetts, and Richard M. Bloch of West Newton, Massachusetts for the issuance of a certificate under the provisions of Title 35, Section 256, of the United States Code, adding the names of the said Walter H. Gray, John O. Wiley and Richard M. Bloch as joint inventors, and a showing and proof of facts satisfying the requirements of the said section having been submitted, it is this 13th day of May 1969, certified that the names of the said Walter H. Gray, John O. Wiley and Richard M. Bloch are hereby added to the said patent as joint inventors with the said Howard W. Wilson.

[SEAL]

EDWIN L. REYNOLDS,
*First Assistant Commissioner of Patents.*